United States Patent
Lacovara

(10) Patent No.: US 11,057,117 B2
(45) Date of Patent: *Jul. 6, 2021

(54) HIGH-BANDWIDTH UNDERWATER DATA COMMUNICATION SYSTEM

(71) Applicant: Magseis FF LLC, Houston, TX (US)

(72) Inventor: Philip Lacovara, Tucson, AZ (US)

(73) Assignee: Magseis FF LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/992,593

(22) Filed: Aug. 13, 2020

(65) Prior Publication Data

US 2020/0374012 A1   Nov. 26, 2020

Related U.S. Application Data

(63) Continuation of application No. 16/745,902, filed on Jan. 17, 2020, now Pat. No. 10,778,342, which is a continuation of application No. 16/405,710, filed on May 7, 2019, now Pat. No. 10,623,110, which is a continuation of application No. 15/334,486, filed on Oct. 26, 2016, now Pat. No. 10,333,629, which is a
(Continued)

(51) Int. Cl.
| | | |
|---|---|---|
| H04B 10/80 | (2013.01) |
| H04B 13/02 | (2006.01) |
| G08C 23/04 | (2006.01) |
| H04B 10/50 | (2013.01) |
| H04L 27/26 | (2006.01) |
| H04B 10/112 | (2013.01) |
| H04B 10/69 | (2013.01) |

(52) U.S. Cl.
CPC ............ *H04B 10/80* (2013.01); *G08C 23/04* (2013.01); *H04B 10/503* (2013.01); *H04B 13/02* (2013.01); *H04B 10/112* (2013.01); *H04B 10/1123* (2013.01); *H04B 10/6931* (2013.01); *H04L 27/2601* (2013.01); *H04L 27/2697* (2013.01)

(58) Field of Classification Search
None
See application file for complete search history.

(56) References Cited

U.S. PATENT DOCUMENTS

| | | |
|---|---|---|
| 3,243,592 A | 3/1966 | Kyi et al. |
| 4,394,573 A | 7/1983 | Correa et al. |
| (Continued) | | |

FOREIGN PATENT DOCUMENTS

| | | |
|---|---|---|
| CN | 1424592 A | 6/2003 |
| CN | 101228719 | 7/2008 |
| (Continued) | | |

OTHER PUBLICATIONS

Examination Report for CA Appln. Ser. No. 2906494 dated Nov. 13, 2020 (3 pages).
(Continued)

*Primary Examiner* — Jai M Lee
(74) *Attorney, Agent, or Firm* — Foley & Lardner LLP; James De Vellis

(57) ABSTRACT

An apparatus is described which uses directly modulated InGaN Light-Emitting Diodes (LEDs) or InGaN lasers as the transmitters for an underwater data-communication device. The receiver uses automatic gain control to facilitate performance of the apparatus over a wide-range of distances and water turbidities.

20 Claims, 8 Drawing Sheets

Related U.S. Application Data continuation of application No. 13/843,942, filed on Mar. 15, 2013, now Pat. No. 9,490,910.

(56) References Cited

U.S. PATENT DOCUMENTS

| | | |
|---|---|---|
| 4,434,364 A | 2/1984 | Correa et al. |
| 4,525,818 A | 6/1985 | Cielo et al. |
| 4,897,821 A | 1/1990 | Thierry et al. |
| 4,995,101 A | 2/1991 | Titterton et al. |
| 5,038,406 A | 8/1991 | Titterton et al. |
| 5,047,990 A | 9/1991 | Gafos et al. |
| 5,111,051 A | 5/1992 | Watanabe |
| 5,142,400 A | 8/1992 | Solinsky |
| 5,267,070 A | 11/1993 | Stewart et al. |
| 5,301,167 A | 4/1994 | Proakis et al. |
| 5,481,158 A | 1/1996 | Kato et al. |
| 5,559,757 A | 9/1996 | Catipovic et al. |
| 5,619,100 A | 4/1997 | Kyushima et al. |
| 5,637,959 A | 6/1997 | Kyushima et al. |
| 6,002,646 A | 12/1999 | Reid et al. |
| 6,089,456 A | 7/2000 | Walsh et al. |
| 6,208,837 B1 | 3/2001 | Koh et al. |
| 6,580,541 B1 | 6/2003 | Yamashita et al. |
| 6,603,124 B2 | 8/2003 | Maublant |
| 6,625,083 B2 | 9/2003 | Vandenbroucke |
| 7,016,260 B2 | 3/2006 | Bary |
| 7,184,670 B2 | 2/2007 | Townsend et al. |
| 7,223,962 B2 | 5/2007 | Fageraas et al. |
| 7,261,162 B2 | 8/2007 | Deans et al. |
| 7,298,672 B1 | 11/2007 | Tenghamn et al. |
| 7,366,055 B2 | 4/2008 | Ronnekleiv et al. |
| 7,417,924 B2 | 8/2008 | Vigen et al. |
| 7,424,225 B1 | 9/2008 | Elliott |
| 7,583,560 B2 | 9/2009 | Chamberlain et al. |
| 7,621,229 B2 | 11/2009 | Bowen et al. |
| 7,646,670 B2 | 1/2010 | Maxwell et al. |
| 7,660,189 B2 | 2/2010 | Vigen et al. |
| 7,660,192 B2 | 2/2010 | Paulsen |
| 7,660,206 B2 | 2/2010 | Berg et al. |
| 7,711,322 B2 | 5/2010 | Rhodes et al. |
| 7,755,971 B2 | 7/2010 | Heatley et al. |
| 7,796,466 B2 | 9/2010 | Combee et al. |
| 7,826,794 B2 | 11/2010 | Rhodes et al. |
| 7,835,221 B2 | 11/2010 | Vigen et al. |
| 7,853,206 B2 | 12/2010 | Rhodes et al. |
| 7,854,569 B1 | 12/2010 | Stenson et al. |
| 7,859,944 B2 | 12/2010 | Zhou et al. |
| 7,873,278 B2 | 1/2011 | Baiden |
| 7,873,316 B2 | 1/2011 | Rhodes et al. |
| 7,877,059 B2 | 1/2011 | Rhodes et al. |
| 7,953,326 B2 | 5/2011 | Farr et al. |
| 8,045,859 B2 | 10/2011 | Bandyopadhyay |
| 8,045,919 B2 | 10/2011 | Rhodes et al. |
| 8,050,881 B1 | 11/2011 | Yeung et al. |
| 8,055,193 B2 | 11/2011 | Rhodes et al. |
| 8,115,620 B2 | 2/2012 | Breed |
| 8,131,213 B2 | 3/2012 | Porter et al. |
| 8,219,024 B2 | 7/2012 | Rhodes et al. |
| 8,233,801 B2 | 7/2012 | Sexton et al. |
| 8,279,714 B2 | 10/2012 | Paul et al. |
| 8,295,708 B2 | 10/2012 | Bandyopadhyay |
| 8,299,424 B2 | 10/2012 | Camilli |
| 8,301,027 B2 | 10/2012 | Shaw et al. |
| 8,305,227 B2 | 11/2012 | Jaffrey et al. |
| 8,310,899 B2 | 11/2012 | Woodard et al. |
| 8,315,560 B2 | 11/2012 | Rhodes et al. |
| 8,326,219 B2 | 12/2012 | Rhodes et al. |
| 8,326,220 B2 | 12/2012 | Rhodes et al. |
| 8,331,856 B2 | 12/2012 | Rhodes et al. |
| 8,335,469 B2 | 12/2012 | Rhodes et al. |
| 8,340,526 B2 | 12/2012 | Camilli et al. |
| 8,346,164 B2 | 1/2013 | Rhodes et al. |
| 8,346,165 B2 | 1/2013 | Rhodes et al. |
| 8,358,973 B2 | 1/2013 | Rhodes et al. |
| 8,364,078 B2 | 1/2013 | Rhodes et al. |
| 8,385,821 B2 | 2/2013 | Rhodes et al. |
| 8,417,183 B2 | 4/2013 | Rhodes et al. |
| 8,440,958 B2 | 5/2013 | Bandyopadhyay |
| 8,457,498 B2 | 6/2013 | Stewart |
| 8,515,343 B2 | 8/2013 | Rhodes et al. |
| 8,515,344 B2 | 8/2013 | Rhodes et al. |
| 8,547,036 B2 | 10/2013 | Tran |
| 8,611,181 B2 | 12/2013 | Woodward et al. |
| 8,670,293 B2 | 3/2014 | Morozov |
| 8,682,244 B2 | 3/2014 | Rhodes et al. |
| 8,750,707 B2 | 6/2014 | Sabet et al. |
| 8,774,638 B2 | 7/2014 | Duligall et al. |
| 8,813,669 B2 | 8/2014 | Race et al. |
| 8,867,315 B2 | 10/2014 | Paul et al. |
| 8,953,911 B1 | 2/2015 | Xu et al. |
| 8,953,944 B2 | 2/2015 | Machado et al. |
| 9,031,413 B2 | 5/2015 | Doniec et al. |
| 9,037,079 B2 | 5/2015 | Wolfe et al. |
| 9,086,325 B2 | 7/2015 | Nash et al. |
| 9,154,234 B2 | 10/2015 | Motley |
| 9,192,030 B2 | 11/2015 | Tran |
| 9,203,342 B2 | 12/2015 | Rongve et al. |
| 9,203,524 B2 * | 12/2015 | Simpson ............. H04B 10/112 |
| 9,231,708 B2 | 1/2016 | Farr et al. |
| 9,294,201 B2 | 3/2016 | Farr et al. |
| 9,490,910 B2 | 11/2016 | Lacovara |
| 9,490,911 B2 | 11/2016 | Hopewell et al. |
| 9,825,713 B2 | 11/2017 | Hopewell et al. |
| 10,263,711 B2 | 4/2019 | Lacovara |
| 10,778,342 B2 * | 9/2020 | Lacovara ............. G08C 23/04 |
| 2001/0026150 A1 | 10/2001 | Klenner |
| 2002/0110048 A1 | 8/2002 | Vandenbroucke |
| 2002/0179364 A1 | 12/2002 | Bussear et al. |
| 2003/0036351 A1 | 2/2003 | Forbes |
| 2003/0111611 A1 | 6/2003 | Maublant |
| 2003/0117893 A1 | 6/2003 | Bary |
| 2004/0016867 A1 | 1/2004 | Milshtein et al. |
| 2004/0208514 A1 | 10/2004 | Zhang et al. |
| 2005/0088916 A1 | 4/2005 | Zhu et al. |
| 2005/0110636 A1 | 5/2005 | Ghaffari |
| 2005/0232634 A1 | 10/2005 | Evangelides et al. |
| 2005/0232638 A1 | 10/2005 | Fucile et al. |
| 2006/0001428 A1 | 1/2006 | Milne et al. |
| 2006/0008275 A1 * | 1/2006 | Lacovara ............. H04B 13/00 398/140 |
| 2006/0062099 A1 | 3/2006 | Yazaki et al. |
| 2006/0159524 A1 | 7/2006 | Thompson et al. |
| 2006/0286931 A1 | 12/2006 | Rhodes et al. |
| 2007/0183782 A1 * | 8/2007 | Farr ...................... H04B 13/02 398/104 |
| 2008/0080318 A1 | 4/2008 | Maxwell et al. |
| 2008/0129510 A1 | 6/2008 | Tuttle |
| 2008/0144442 A1 | 6/2008 | Combee et al. |
| 2008/0205892 A1 | 8/2008 | Baiden |
| 2009/0045741 A1 | 2/2009 | Kyushima et al. |
| 2009/0067289 A1 | 3/2009 | Lee et al. |
| 2009/0074422 A1 | 3/2009 | Stewart |
| 2009/0080290 A1 | 3/2009 | Ray et al. |
| 2009/0208219 A1 | 8/2009 | Rhodes et al. |
| 2009/0214224 A1 | 8/2009 | Cho et al. |
| 2009/0274465 A1 | 11/2009 | Bandyopadhyay |
| 2009/0279384 A1 | 11/2009 | Pavel |
| 2010/0008666 A1 | 1/2010 | Kovsh et al. |
| 2010/0014618 A1 | 1/2010 | Tsukio et al. |
| 2010/0133443 A1 | 6/2010 | Ohtani |
| 2010/0212574 A1 | 8/2010 | Hawkes et al. |
| 2010/0227551 A1 | 9/2010 | Volanthen et al. |
| 2010/0227552 A1 | 9/2010 | Volanthen et al. |
| 2011/0005801 A1 | 1/2011 | Olivier et al. |
| 2011/0058814 A1 | 3/2011 | Camilli et al. |
| 2011/0076940 A1 | 3/2011 | Rhodes et al. |
| 2011/0222374 A1 | 9/2011 | Berg et al. |
| 2011/0229141 A1 * | 9/2011 | Chave .................. H04B 13/02 398/104 |
| 2011/0267073 A1 | 11/2011 | Chengson et al. |
| 2011/0300008 A1 | 12/2011 | Fielder et al. |
| 2011/0300794 A1 | 12/2011 | Rhodes et al. |
| 2012/0017989 A1 | 1/2012 | Chang et al. |
| 2012/0069702 A1 | 3/2012 | Muyzert et al. |

(56) References Cited

U.S. PATENT DOCUMENTS

| | | |
|---|---|---|
| 2012/0099399 A1 | 4/2012 | Lichter et al. |
| 2012/0105246 A1 | 5/2012 | Sexton et al. |
| 2012/0170935 A1 | 7/2012 | Machado et al. |
| 2012/0177367 A1 | 7/2012 | Miller |
| 2012/0263476 A1 | 10/2012 | Sabet et al. |
| 2012/0325919 A1 | 12/2012 | Warren et al. |
| 2013/0010612 A1 | 1/2013 | Lee et al. |
| 2013/0083622 A1 | 4/2013 | Herrmann et al. |
| 2013/0187787 A1 | 7/2013 | Damus et al. |
| 2013/0195465 A1 | 8/2013 | Rhodes et al. |
| 2013/0271088 A1 | 10/2013 | Hwang et al. |
| 2013/0279299 A1 | 10/2013 | Rhodes et al. |
| 2013/0315265 A1 | 11/2013 | Webb et al. |
| 2013/0330083 A1 | 12/2013 | Song et al. |
| 2014/0003199 A1 | 1/2014 | Dougan et al. |
| 2014/0051352 A1 | 2/2014 | Wolfe et al. |
| 2014/0086008 A1 | 3/2014 | Pharris et al. |
| 2014/0161466 A1 | 6/2014 | Riza |
| 2014/0177387 A1 | 6/2014 | Brizard |
| 2014/0198607 A1 | 7/2014 | Etienne et al. |
| 2014/0212142 A1 | 7/2014 | Doniec et al. |
| 2014/0254315 A1 | 9/2014 | Rigsby et al. |
| 2014/0254649 A1 | 9/2014 | Afkhami et al. |
| 2014/0301161 A1 | 10/2014 | Brizard et al. |
| 2014/0341584 A1 | 11/2014 | Hopewell et al. |
| 2014/0363166 A1 | 12/2014 | Lacovara |
| 2015/0000582 A1 | 1/2015 | Lelaurin et al. |
| 2015/0088695 A1 | 3/2015 | Lorbiecki et al. |
| 2015/0132004 A1 | 5/2015 | Farr et al. |
| 2015/0188695 A1 | 7/2015 | Crowell |
| 2015/0219790 A1 | 8/2015 | Gateman et al. |
| 2015/0372769 A1 | 12/2015 | Farr et al. |
| 2016/0041280 A1 | 2/2016 | Naes et al. |
| 2016/0094298 A1 | 3/2016 | Isfeldt et al. |
| 2016/0121009 A1 | 5/2016 | Farr et al. |
| 2016/0124105 A1 | 5/2016 | Valsvik et al. |
| 2016/0127042 A1 | 5/2016 | Farr et al. |
| 2016/0170060 A1 | 6/2016 | Hopewell et al. |
| 2016/0349387 A1 | 12/2016 | Rokkan et al. |
| 2017/0114635 A1 | 4/2017 | Kyle et al. |
| 2017/0168177 A1 | 6/2017 | Wang et al. |
| 2017/0237458 A1 | 8/2017 | Vanduyn et al. |

FOREIGN PATENT DOCUMENTS

| | | |
|---|---|---|
| CN | 101365964 A | 2/2009 |
| CN | 102098112 | 6/2011 |
| CN | 102201872 A | 9/2011 |
| CN | 102565870 A | 7/2012 |
| CN | 102916744 A | 2/2013 |
| CN | 103095380 | 5/2013 |
| CN | 104038292 | 9/2014 |
| CN | 204103926 | 1/2015 |
| CN | 104618032 | 5/2015 |
| EP | 1 891 457 | 2/2008 |
| EP | 1 891 762 | 2/2008 |
| EP | 2 341 644 | 7/2011 |
| EP | 2 362 559 | 8/2011 |
| EP | 2 657 723 | 10/2013 |
| EP | 2 866 051 | 4/2015 |
| EP | 2 913 942 | 9/2015 |
| GB | 2 511 938 | 7/2016 |
| JP | 6139640 | 2/1986 |
| RU | 2431868 C1 | 10/2011 |
| RU | 2539745 C1 | 1/2015 |
| WO | WO-2005/074426 A1 | 8/2005 |
| WO | WO-2009/039488 A1 | 3/2009 |
| WO | WO-2010/021810 | 2/2010 |
| WO | WO-2010/076646 A1 | 7/2010 |
| WO | WO-2011/139159 A1 | 11/2011 |
| WO | WO-2012/123698 | 9/2012 |
| WO | WO-2013/160475 | 10/2013 |

OTHER PUBLICATIONS

First Office Action for CN 201780052733.1 dated Sep. 2, 2020 (26 pages).

Agrawal et al., "Free Space Optical Sensor Networking for Underwater Sensing Applications", Intelligent Sensors, Sensor Networks and Information Processing (ISSNIP), 2009 5th International Conference, IEEE, Dec. 7, 2009, pp. 475-480 (6 pages).

Akyildiz, Ian F., "Challenges for Efficient Communication in Underwater Acoustic Sensor Networks", ACM Sigbed Review 1.2 (2004), pp. 3-8 (6 pages).

Ambalux Corporation Company Information, 2010 (5 pages).

Arnon et al., "Non-line-of-sight underwater optical wireless communication network", J. Opt. Soc. Am. A, 26.3 (2009), pp. 530-539 (10 pages).

Bajwa et al., "Smart Transmitters and Receivers for Underwater Free-Space Optical Communication—A Review," International Conference on Communications, Computing & Systems, 2014 (6 pages).

Brundage, Heather, "Designing a Wireless Underwater Optical Communication System", Massachusetts Institute of Technology, Feb. 2010 (69 pages).

Concise Description of Relevance and Third-Party Submission under 37 CFR 1.290 for U.S. Appl. No. 15/625,708 dated Jul. 5, 2018 (6 pages).

Corrected Notice of Allowability for U.S. Appl. No. 15/081,627 dated Sep. 14, 2017 (2 pages).

Corrected Notice of Allowability for U.S. Appl. No. 15/625,722 dated Jul. 23, 2019 (2 pages).

Cox Jr., William C., "A 1 Mpbs Underwater Communication System Using a 405 nm Laser Diode and Photomultiplier Tube", North Carolina State University, 2007, Raleigh, North Carolina (110 pages).

Destrez et al., "Underwater High Bit-Rate Optical Free-Space Communication System," International Workshop on Optical Wireless Communications (IWOW), 2012 (3 pages).

Drakeley et al., "Permanent ocean bottom seismic systems to improve reservoir management", Offshore 63.1, Jan. 2003 (4 pages).

European Extended Search Report for EP 14798429.8 dated Aug. 10, 2016 (11 pages).

Examination Report for AU 2014265955 dated Mar. 16, 2017 (2 pages).

Examination Report for AU 2017261530 dated Jan. 2, 2019 (2 pages).

Examination Report for EP 14 798 429.8-1220 dated May 2, 2018 (5 pages).

Extended European Search Report for EP 19212421.2 dated Mar. 19, 2020 (9 pages.).

Farr et al. "An integrated, underwater optical /acoustic communications system", Woods Hole Oceanographic Institution, 2010, Woods Hole, Massachusetts (6 pages).

Farr et al., "Demonstration of Wireless Data Harvesting from a Subsea Node Using a 'Ship of Opportunity'", Woods Hole Oceanographic Institute (5 pages).

Farr et al., "Final Technical Report: Optical Data Transmission in a Turbid Environment", Woods Hole Oceanographic Institute, Jun. 23, 2014 (6 pages).

Farr et al., "Optical communication system expands CORK seafloor observatory's bandwidth", Oceans 2010, IEEE, Sep. 20, 2010, pp. 1-6 (6 pages).

Farr et al., "Optical Modem Technology for Seafloor Observatories", Woods Hole Oceanographic Institution, Woods Hole, Massachusetts, 2006, pp. 1-6 (6 pages).

Final Office Action for U.S. Appl. No. 13/843,942 dated Jun. 2, 2016 (31 pages).

Final Office Action for U.S. Appl. No. 13/843,942 dated Jun. 26, 2015 (30 pages).

Final Office Action for U.S. Appl. No. 15/334,486 dated Oct. 22, 2018 (17 pages).

Final Office Action for U.S. Appl. No. 15/334,486 dated Aug. 24, 2017 (43 pages).

Final Office Action for U.S. Appl. No. 15/625,708 dated Feb. 25, 2019 (8 pages).

(56) References Cited

OTHER PUBLICATIONS

Final Office Action for U.S. Appl. No. 15/625,708 dated Dec. 9, 2019 (11 pages).
Final Office Action for U.S. Appl. No. 15/664,697 dated Mar. 29, 2018 (30 pages).
First Office Action for MX/a/2015/013171 dated Mar. 17, 2017 (2 pages).
First Office Action for CN 201480021465.3 dated Dec. 29, 2016 (10 pages).
First Office Action for CN. 201710785328.2 dated Jul. 2, 2020 (11 pages).
First Office Action for MX/a/2017/011038 dated Oct. 9, 2018 (3 pages).
Gabriel et al., "Channel Modeling for Underwater Optical Communication," IEEE Global Communications Conference, Dec. 2011 (5 pages).
Gabriel et al., "Monte-Carlo-Based Channel Characterization for Underwater Optical Communication Systems", Journal of Optical Communications and Networking, vol. 5, Issue 1, Jan. 2013, Archimer (27 pages).
Gabriel et al., "Optical Communication System for an Underwater Wireless Sensor Network," Ifremer Data Sheet, EGU General Assembly, Apr. 2012 (1 page).
Garcia-Hernandez et al., "Wireless Sensor Networks and Applications: A Survey", IJCSNS International Journal of Computer Science and Network Security,7.3, 2007, pp. 264-273 (10 pages).
Giles, John W., "Underwater Optical Communication Systems: Part 2: Basic Design Consideration," IEEEE Military Communications Conference, 2005, MILCOM 2005, IEEE Atlantic City, pp. 1-6 (6 pages).
Gratttan et al., "Optical Fiber Sensor Technology: Fundamentals", Optical Fiber Sensor Technology, 2000, pp. 239-292 (54 pages).
Hammock, "Multiple-anode PMT behaves like many detectors in one," Laser Focus World, May 1, 2001, pp. 1-7 (7 pages).
Hanson, et al., "High Bandwidth Underwater Optical Communication," Applied Optics, vol. 47, No. 2, Jan. 10, 2008, pp. 277-283 (7 pages).
Hays et al., "A New Method of Semi-permanent Reservoir Monitoring in Deep Water Using Ocean Bottom Nodes", Offshore Technology Conference, pp. 1-9, May 2-5, 2016, Houston, Texas, USA (9 pages).
International Preliminary Report on Patentability and Written Opinion for PCT/US2017/038166 dated Jan. 1, 2019 (8 pages).
International Search Report and Written Opinion for PCT/US2014/024392 dated Nov. 25, 2014 (8 pages).
International Search Report and Written Opinion for PCT/US2017/038166 dated Dec. 13, 2018 (17 pages).
Jawhar et al., "An Efficient Framework for Autonomous Underwater Vehicle Extended Sensor Networks for Pipeline Monitoring", IEEE International Symposium on Robotic and Sensors Environments, 2013, pp. 1-6, Washington DC, USA (6 pages).
Longacre et al., "High Data Rate Underwater Laser Communications", 1302 Ocean Optics X, SPIE, 1990 (14 pages).
Media Relations Office, "Optical system promises to revolutionize undersea communications", Woods Hole Oceanographic Institution News Release, Feb. 23, 2010, pp. 1-3 (3 pages).
Minev et al., "Short Range Optical OFDM", IEEE, 2011, Newcastle University School of Electrical and Electronic Engineering, Newcastle Upon Tyne, UK (5 pages).
Non-Final Office Action for U.S. Appl. No. 13/843,942 dated Dec. 15, 2015 (31 pages).
Non-Final Office Action for U.S. Appl. No. 13/843,942 dated Oct. 15, 2014 (32 pages).
Non-Final Office Action for U.S. Appl. No. 14/203,550 dated Jun. 18, 2015 (10 pages).
Non-Final Office Action for U.S. Appl. No. 14/203,550 dated Feb. 2, 2016 (12 pages).
Non-Final Office Action for U.S. Appl. No. 15/081,627 dated Mar. 17, 2017 (14 pages).
Non-Final Office Action for U.S. Appl. No. 15/237,106 dated Jun. 15, 2017 (8 pages).
Non-Final Office Action for U.S. Appl. No. 15/334,486 dated Jan. 19, 2017 (43 pages).
Non-Final Office Action for U.S. Appl. No. 15/334,486 dated Apr. 3, 2018 (43 pages).
Non-Final Office Action for U.S. Appl. No. 15/625,708 dated Sep. 4, 2018 (9 pages).
Non-Final Office Action for U.S. Appl. No. 15/625,708 dated Jul. 8, 2019 (9 pages).
Non-Final Office Action for U.S. Appl. No. 15/625,722 dated Sep. 18, 2018 (9 pages).
Non-Final Office Action for U.S. Appl. No. 15/625,730 dated Sep. 21, 2018 (7 pages).
Non-Final Office Action for U.S. Appl. No. 15/664,697 dated Sep. 20, 2017 (30 pages).
Non-Final Office Action for U.S. Appl. No. 15/664,697 dated Sep. 21, 2018 (14 pages).
Non-Final Office Action for U.S. Appl. No. 15/664,707 dated May 2, 2018 (19 pages).
Non-Final Office Action for U.S. Appl. No. 15/664,707 dated Jul. 5, 2018 (19 pages).
Non-Final Office Action for U.S. Appl. No. 16/405,710 dated Jun. 13, 2019 (23 pages).
Non-Final Office Action for U.S. Appl. No. 16/745,902 dated Apr. 15, 2020 (25 pages).
Notice of Allowance for U.S. Appl. No. 13/843,942 dated Aug. 17, 2016 (8 pages).
Notice of Allowance for U.S. Appl. No. 13/843,942 dated Sep. 20, 2016 (9 pages).
Notice of Allowance for U.S. Appl. No. 14/203,550 dated Sep. 16, 2016 (5 pages).
Notice of Allowance for U.S. Appl. No. 14/203,550 dated Sep. 24, 2015 (7 pages).
Notice of Allowance for U.S. Appl. No. 14/203,550 dated Jun. 29, 2016 (5 pages).
Notice of Allowance for U.S. Appl. No. 15/081,627 dated Aug. 28, 2017 (5 pages).
Notice of Allowance for U.S. Appl. No. 15/081,627 dated Jan. 3, 2018 (5 pages).
Notice of Allowance for U.S. Appl. No. 15/081,627 dated May 7, 2018 (5 pages).
Notice of Allowance for U.S. Appl. No. 15/081,627 dated Aug. 8, 2018 (5 pages).
Notice of Allowance for U.S. Appl. No. 15/237,106 dated Sep. 12, 2017 (5 pages).
Notice of Allowance for U.S. Appl. No. 15/334,486 dated Feb. 14, 2019 (9 pages).
Notice of Allowance for U.S. Appl. No. 15/625,708 dated Apr. 13, 2020 (5 pages).
Notice of Allowance for U.S. Appl. No. 15/625,722 dated Sep. 11, 2019 (5 pages).
Notice of Allowance for U.S. Appl. No. 15/625,722 dated Mar. 15, 2019 (5 pages).
Notice of Allowance for U.S. Appl. No. 15/625,722 dated Jul. 17, 2019 (5 pages).
Notice of Allowance for U.S. Appl. No. 15/625,730 dated Oct. 18, 2019 (5 pages).
Notice of Allowance for U.S. Appl. No. 15/625,730 dated Feb. 20, 2020 (5 pages).
Notice of Allowance for U.S. Appl. No. 15/625,730 dated Jan. 24, 2019 (5 pages).
Notice of Allowance for U.S. Appl. No. 15/625,730 dated May 8, 2019 (5 pages).
Notice of Allowance for U.S. Appl. No. 15/664,697 dated Dec. 18, 2018 (9 pages).
Notice of Allowance for U.S. Appl. No. 15/664,707 dated Oct. 3, 2018 (5 pages).
Notice of Allowance for U.S. Appl. No. 15/664,707 dated Mar. 5, 2019 (5 pages).
Notice of Allowance for U.S. Appl. No. 16/405,710 dated Sep. 17, 2019 (10 pages).

(56) References Cited

OTHER PUBLICATIONS

Notice of Allowance for U.S. Appl. No. 16/405,710 dated Nov. 27, 2019 (2 pages).
Notice of Allowance for U.S. Appl. No. 16/745,902 dated Jul. 1, 2020 (8 pages).
Office Action for CA 2906494 dated Feb. 11, 2020 (5 pages).
Office Action for RU 2015141623/07(064280) dated Oct. 13, 2016 (16 pages).
Office Action for RU 2017121984 dated Dec. 18, 2018 (13 pages).
Pontbriand et al., "Wireless Data Harvesting Using the AUV Sentry and WHOI Optical Modem", Woods Hole Oceanographic Institution, 2015 (6 pages).
Preliminary Report on Patentability for PCT/US2014/024392 dated Sep. 24, 2015 (7 pages).
Sackinger, Eduard, "Broadband Circuit for Optical Fiber Communication", Wiley-Interscience, 2005 (46 pages).
Simpson et al., "Smart Transmitters and Receivers for Underwater Free-Space Optical Communication," IEEE Journal on Selected Areas in Communications, vol. 30, No. 5, pp. 964-974, Jun. 2012 (11 pages).
Simpson, Jim A., "Underwater Free-Space Optical Communication Using Smart Transmitters and Receivers", Dissertation, North Carolina State University, 2012, Raleigh, North Carolina (154 pages).
Smart, Jeffrey H., "Underwater Optical Communications Systems Part 1: Variability of Water Optical Parameters", Military Communications Conference, 2005. MILCOM 2005. IEEE Atlantic City, Oct. 17, 2005 pp. 1-7 (7 pages).
Song et al., "Investigation of Geometrical Effects of Antireflective Subwavelength Grating Structures for Optical Device Applications", Springer Science+Business Media, LLC, Jun. 19, 2010, pp. 771-777 (8 pages).
Sta-rite Swimquip Brand Underwater Pool Lights and Niches for 12 and 120 Volt Light Fixtures Owners Manual, 2003 (8 pages).
Technip Metrology Report, Field Report No. CG-TUKOOOI-FS-FR-269, Jun. 26 2016, http://eprints2.insa-strasbourg.fr/2564/2/2016_Wilhelm_Lau re_Annexes_PFE_Topographie.pdf.
Third Party Observations for PCT/US2014/024392 dated Apr. 1, 2016 (4 pages).
Vasilescu et al., "Data Collection Storage and Retrieval with an Underwater Sensor Network", SenSys '05, Nov. 2-4, 2005, pp. 154-165, San Diego, California, USA.
Walker, Chris, "Permanent Monitoring—Do it with Nodes?", Finding Petroleum, Fairfield Nodal presentation, Nov. 27, 2012 (50 pages).
Wilson, David, "Woods Hole researchers develop sub-sea comms system", The Engineer.co.uk, Jul. 12, 2010, pp. 1-2 (2 pages).
Woods Hole Oceanographic Institution, "WHOI Scientists and Engineers Partner with World-Renowned Companies to Market Revolutionary New Instruments," www.whoi.edu, Jul. 19, 2012, pp. 1-4 (4 pages).
Yoon, et al. "AURP: An AUV-Aided Underwater Routing Protocol for Underwater Acoustic Sensor Networks" Sensors, vol. 12, Feb. 9, 2012, pp. 1827-1845 (19 pages).
Bereketli et al., "Remotely Powered Underwater Acoustic Sensor Networks", IEEE Sensors Journal, vol. 12, No. 12, Dec. 2012, pp. 3467-3472 (6 pages).
Cuixia et al., "Design of Low-power Wake-up Circuits in Underwater Acoustic Communication", 2012 International Conference on Medical Physics and Biomedical Engineering, Physics Procedia, vol. 33, 2012, pp. 884-891 (8 pages).
Guerra et al., "Performance Evaluation of Random and Handshake-Based Channel Access in Collaborative Mobile Underwater Networks", IEEE, 2010 (7 pages).
Non-Final Office Action for U.S. Appl. No. 16/201,256 dated Apr. 9, 2021 (13 pages).
Office Action for ID Appln. Serial No. PID201900015 dated Feb. 22, 2021 (4 pages).

\* cited by examiner

HIGH-BANDWIDTH UNDERWATER DATA COMMUNICATION SYSTEM

CROSS-REFERENCES TO RELATED APPLICATIONS

This application claims the benefit of priority under 35 U.S.C. § 120 as a continuation of U.S. patent application Ser. No. 16/745,902, filed Jan. 17, 2020, which claims the benefit of priority under 35 U.S.C. § 120 as a continuation of U.S. patent application Ser. No. 16/405,710, filed May 7, 2019, which claims the benefit of priority under 35 U.S.C. § 120 as a continuation of U.S. patent application Ser. No. 15/334,486, filed Oct. 26, 2016, which claims the benefit of priority under 35 U.S.C. § 120 as a continuation of U.S. patent application Ser. No. 13/843,942, filed Mar. 15, 2013 and that issued as U.S. Pat. No. 9,490,910 on Nov. 8, 2016, each of which are hereby incorporated herein by reference in their entirety.

FIELD OF THE INVENTION

The invention relates to the transmission of data between underwater entities, particular at high data rates.

BACKGROUND

This Background section is provided for informational purposes only, and should not be considered as an admission that any of the material contained in this section qualifies as prior art to the present application.

There is a need for conveying data between two separate underwater entities in applications including defense, oceanography, hydrocarbon development, etc. Conventional methods for conveying data between underwater entities employ either a tethered link using copper or fiber optics, or rely on acoustic transmission. According to the former approach, the underwater entities must be repositioned or replaced in situ, while the latter approach has a very low data rate (1 to 20 kilobits per second is typical) that is currently possible using acoustic transmission. An approach that uses light propagating freely in the ocean environment would provide much higher data rates and the possibility of conveniently exchanging data between arbitrary pairs of transmitting and receiving devices (transceivers).

Some attempts to implement data transmission between underwater entities using optical means have been frustrated by a lack of suitable light sources. The propagation of light through water is limited by the fundamental absorption properties of pure water, scattering of particulates such as plankton and inorganic particulates, and absorption by chlorophyll-containing phytoplankton and other organic materials. The components combine, in various combinations, to favor strongly the transmission of light in the blue-green region of the optical spectrum, approximately from 400 to 600 nm. The optical effect of the various combinations of the components admixed in water can be summarized as water types and range from the very purest natural waters, which favor deep blue propagation (nominally 450 nm), to waters which favor blue-green (nominally 490 nm) and green (nominally 530 nm) propagation. The minimum optical attenuation coefficients at the optimal wavelengths vary from about 0.02 m-1 for the very clearest natural waters, to more than 2 m-1 in the most turbid coastal or harbor waters.

Previous light sources in the blue-green wavelength range have included been bulky, inefficient, expensive and employed external modulators.

SUMMARY

At least one aspect of the present disclosure is direct to a device for transmitting and receiving data optically through an aqueous medium. In some embodiments, the device includes an optical transmitter. The device can also include an optical receiver. The transmitter and receiver can operate using light with wavelengths in the range of 400 nm-600 nm.

In one embodiment, the optical transmitter and optical receiver of the device are enclosed in a waterproof container. The optical container can include one or more optical windows. Light can be transmitted through the one or more optical windows through the waterproof container and into or out of the aqueous medium.

In one embodiment, the optical transmitter includes at least one solid state light source.

In one embodiment, the light source is an InGaN based light source.

In one embodiment, the light source includes an LED.

In one embodiment, the light source includes a laser.

In one embodiment, the device is configured to transmit data at a rate of about 10 Mbps or greater.

In one embodiment, the device is configured to transmit data at a rate of about 100 Mbps or greater.

In one embodiment, the device includes a controller configured to modulate the output of the light source. The controller can modulate the output of the light source by varying a drive current to the source.

In one embodiment, the optical receiver includes a photodiode.

In one embodiment, the optical receiver includes at least one from the list consisting of: a silicon photodiode, silicon PIN photodiode, and avalanche photodiode, and a hybrid photodiode.

In one embodiment, the optical receiver includes a photomultiplier tube.

In one embodiment, the photomultiplier tube includes a plurality of gain stages. An output can be extracted from a gain stage prior to a final gain stage.

In one embodiment, the optical receiver is configured to use a measurement of the optical signal strength to control the gain of an amplifier following the optical detector.

In one embodiment, the optical receiver is configured to use a measurement of the optical signal strength to control a gain of the optical detector.

In one embodiment, the device includes at least one controller operatively coupled to one or both of the transmitter and receiver. The controller can be configured to implement a channel coding technique during transmission.

In one embodiment, the devices includes at least one controller operatively coupled to one or both of the transmitter and receiver. The controller can be configured to dynamically adjust one or more transmission parameters. The controller can dynamically adjust the transmission parameters responsive to one or more detected transmission conditions.

In one embodiment, dynamically adjusting one or more transmission parameters includes controlling the gain of one or more amplifier elements in the device.

In one embodiment, the device includes at least one controller operatively coupled to one or both of the transmitter and receiver. The controller can be configured to implement a multi-carrier transmission modulation techniques.

In one embodiment, the modulation technique can include optically based Orthogonal Frequency Division Multiplexing (OFDM).

In one embodiment, the transceiver is configured to enter a power up state in response to the detected presence of another data transmission device.

In one embodiment, the device includes a controller configured to align a local transceiver with a remote transceiver. The controller can align the local transceiver with the remote transceiver based on a signal from the one or more optical detectors that can sense the relative angle of the remote transceiver.

In one embodiment, the device includes a controller configured to align a local transceiver with a remote transceiver based on a signal from one or more sensors used to detect the relative position of the remote transceiver.

In one embodiment, the controller is configured to control a platform for the device based at least in part on the detected position information.

In one embodiment, the device includes a controller configured to control a plurality of transmitting sources to direct light to the remote transceiver. The controller can control the plurality of transmitting sources based on a signal from one or more optical detectors used to sense the relative angle of the remote transceiver.

In one embodiment, the device includes a controller configured to select an anode in a multiple-anode photomultiplier tube and align a local receiver's angular field of view with the remote transceiver. The controller can select the anode and align the local receiver's angular field view based on a signal from one or more optical detectors are used to sense the relative angle of a remote transceiver.

In one embodiment, the device includes a controller configured to provide guidance commands to a platform on which the device is mounted. The one or more optical detectors can be used to sense the relative angle of a remote transceiver.

In one embodiment, the device is incorporated in an all-optical system for transmission of seismic data.

In one embodiment, the one or more diffractive optical elements are used to collect an optical transmission beam.

In one embodiment, the one or more diffractive optical elements are used to steer an optical transmission beam.

In one embodiment, one or more diffractive optical elements are used to shape an optical transmission beam.

In one embodiment, the device is mounted on or in at least one from the list consisting of: a remotely operated vehicle, an autonomously operated vehicle, a submarine vessel, and an ocean bottom seismic node.

In one embodiment, the device includes an acoustic communication device.

At least one aspect is directed to a method that includes optically transmitting data through an aqueous medium using light with wavelengths in the range of 400 nm-600 nm.

In one embodiment, the method includes generating the light using at least one solid state light source.

In one embodiment of the method, the light source includes an LED.

In one embodiment, the light source includes a laser.

In one embodiment, the step of optically transmitting data includes transmitting data at a rate of at least about 10 Mbps.

In one embodiment, the step of optically transmitting data includes transmitting data at a rate of at least 100 Mbps.

In one embodiment, the step of optically transmitting data includes using one or more channel coding techniques.

In one embodiment, the step of optically transmitting data includes dynamically adjusting one or more transmission parameters. The transmission parameters can be dynamically adjusted in response to one or more detected transmission conditions.

In one embodiment, the step of optically transmitting data includes implementing a multi-carrier transmission modulation technique.

In one embodiment, the modulation technique includes optically based Orthogonal Frequency Division Multiplexing (OFDM).

DETAILED DESCRIPTION

Figure 1:
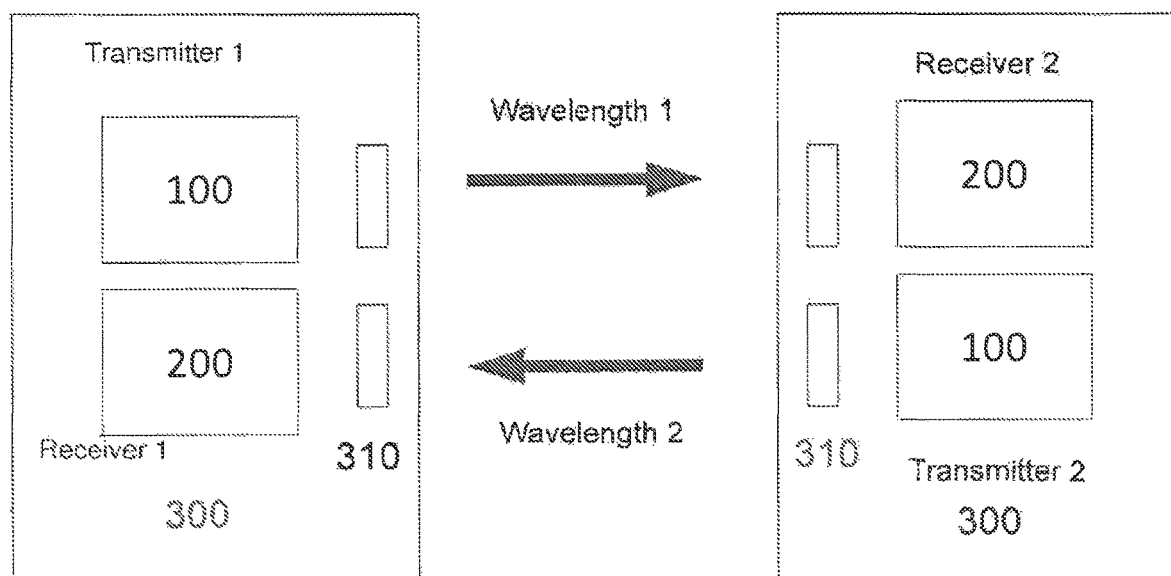
FIG. 1 is a block diagram showing operation of an exemplary pair of transceivers in communication with each other.

Applicants have recognized that optical data transceivers may be provided that operate in an aqueous medium. In some embodiments, the transceivers operate with high data transfer rates, e.g., greater than about 1 megabyte per second (Mbps), about 10 Mbps, about 100 Mbps or more.

In some embodiments, the devices use light sources, e.g., lasers light sources or light emitting diode ("LED") sources, with outputs in the blue-green region of the spectrum, e.g., with wavelengths in the range of 400-600 nm or any subrange thereof.

For example, in some embodiments, solid-state light emitters, e.g., based upon the Indium-Gallium-Nitride (InGaN) semiconductor materials now provide a family of light sources in the blue-green spectral region that are efficient, compact, long-lived, and can be directly modulated (their optical output power controlled by the amount of electrical current flow in the device). Such devices may operate at wavelengths throughout the blue-green region. Because these devices can be directly modulated, e.g., by modulating a drive current, they can be arranged in arrays for increased output power or for transmission into other spatial directions such as between platforms with relative movement.

In some embodiments, the receiver portion of the transceiver device includes one or more optical detectors that are sensitive in the blue-green spectral region that may be compact and reliable. Examples include detectors using semiconductor junctions such as PN junctions or PIN junctions (e.g., silicon PIN photodiodes or avalanche photodiodes). For example, in some embodiments, avalanche photodiodes may be used that, with the proper electrical bias voltage applied, exhibit electronic gain, which can be useful in certain implementations. Photomultiplier tubes may also be used in the blue-green, and have the advantage, like avalanche photodiodes, of voltage-dependent electronic gain, as well as fast temporal response even with large collecting areas.

In some embodiments, the optical detector's active or photosensitive area places simultaneous constraints on the collecting area of a receiver lens and the angular field over which light intercepted by the receiver lens actually lands on the detector (the angular field of view). Under some applications, particularly where one or another underwater platform is maneuvering, the angular field of view possible with temporally optimal detectors will be too small to maintain a communication connection. Also, it may be useful to reduce the angular spread of the transmitter beam in order to increase the intercepted power on a remote receiver. In this case it may be advantageous to mount the transmitter and receiver on controllable mounts (e.g., gimbals), or to provide a mechanism (e.g., an electrical or electromechanical mechanism) for the transmitter output beam and/or the receiver field of view to follow a remote transmitter and receiver. Guidance commands for the motion of the transmitter and receiver can be generated using, e.g., a system of optical detectors or a multi-element detector with appropriate signal processing to interpret varying light levels from the remote transmitter and guide the direction of the transmitter beam and the receiver field of view.

Referring to FIG. 1, an optical communication system that transmit data through an aqueous medium includes a first optical transceiver 10 and a second optical transceiver 20. Each transceiver includes an optical transmitter 100 and an optical receiver 200. As shown, the optical transmitter 100 and an optical receiver 200 of transceiver 10 are packaged together in a housing 300 to provide bi-directional data transmission with a similarly packaged optical transceiver 20.

Each of the transceivers may be mounted on any suitable platform including an underwater vehicle (e.g., a submarine, remotely operated vehicle, or autonomously operated vehicle), an underwater device (e.g., an ocean bottom seismic node, such as the types available from FairfieldNodal, Inc. of Sugarland, Tex.), an underwater structure (e.g., an oil drilling or pumping platform), or any other suitable object.

A transmitter and receiver packaged together are referred to as a transceiver. Although the embodiments shown focus on transceiver packages, it is to be understood that in various embodiments, the transmitter and receiver may be separately packaged. In some embodiments, a single transmitter in a single receiver may be used for uni-directional communication.

As shown in FIG. 1, simultaneous bi-directional data transmission may be accomplished by the use of spectrally separated wavelengths, so that the transmitter of transceiver one may transmit a wavelength 1 (for example, a blue wavelength or band of wavelengths, such as might be emitted by an InGaN LED) and the transmitter of transceiver 2 transmits a wavelength 2 for example, a blue-green or green wavelength or band of wavelengths). The receiver of transceiver 2 will be configured to receive the wavelength 1 of transmitter 1 and reject the wavelength 2 of transmitter 2 and all or as many as possible wavelengths outside the band of wavelength 1 using optical filters. Other data transmission schemes may be employed as well. For example, instead of separating the upstream and downstream signals by wavelength, they may instead be transmitted using time-division multiplexing or by polarization. Similarly, code-division multiplexing and other data transmission schemes may be used.

Various embodiments include the capacity to incorporate multi-carrier transmission modulation techniques such as optically based Orthogonal Frequency Division Multiplexing (OFDM). Many closely spaced subcarriers are utilized to increase the overall transmission rate. The optical data can also be transmitted using coherent OFDM, CO-OFDM, protocols using single carrier or multicarrier transmission schemes.

Similarly receiver of transceiver 1 may be configured to receive wavelength 2 of transmitter 2 and reject the wavelength of transmitter 1 and all or as many as possible wavelengths outside of the band of wavelength 2.

Figure 2:
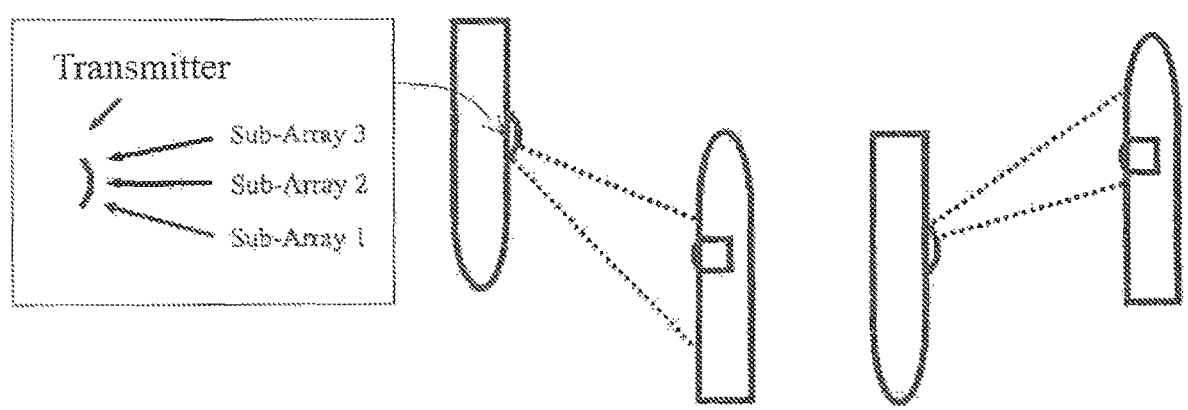
FIG. 2 is an illustration of exemplary pairs of transceivers.

Another embodiment, shown in FIG. 2, provides for bidirectional transmission by spatial separation of the respective transmitters and receivers. Here the transmitter 1 of transceiver 1 is aligned (e.g., closely aligned) with receiver 2 of transceiver 2, and the transmitter 2 of transceiver 2 is aligned (e.g., closely aligned) with the receiver 2 of transceiver 2, so as to prevent light emitted by transmitter 1 but scattered by the intervening aqueous medium from entering receiver 1, and similarly the light from transmitter 2 but scattered by the intervening aqueous medium is unable to enter receiver 2.

Various embodiments may include one or more mechanisms to direct the output light from a transmitter in the direction of a receiver and/or to cause the field of view of a receiver to track the output of a transmitter. In addition to mechanical scanning of the transmitter and receiver to change the pointing direction, electronic systems may also be used. An electronic system capable of scanning the transmitter direction may arrange a plurality of individual light sources (e.g. LEDs or lasers), or a plurality of arrays of light sources, pointing in different directions so that the device or array pointing in the direction of interest can be used to transmit the data, as shown in FIG. 2. In this way the power consumption of the transceiver can be significantly reduced compared to a system that transmits power into a larger angular field of view.

Figure 3:
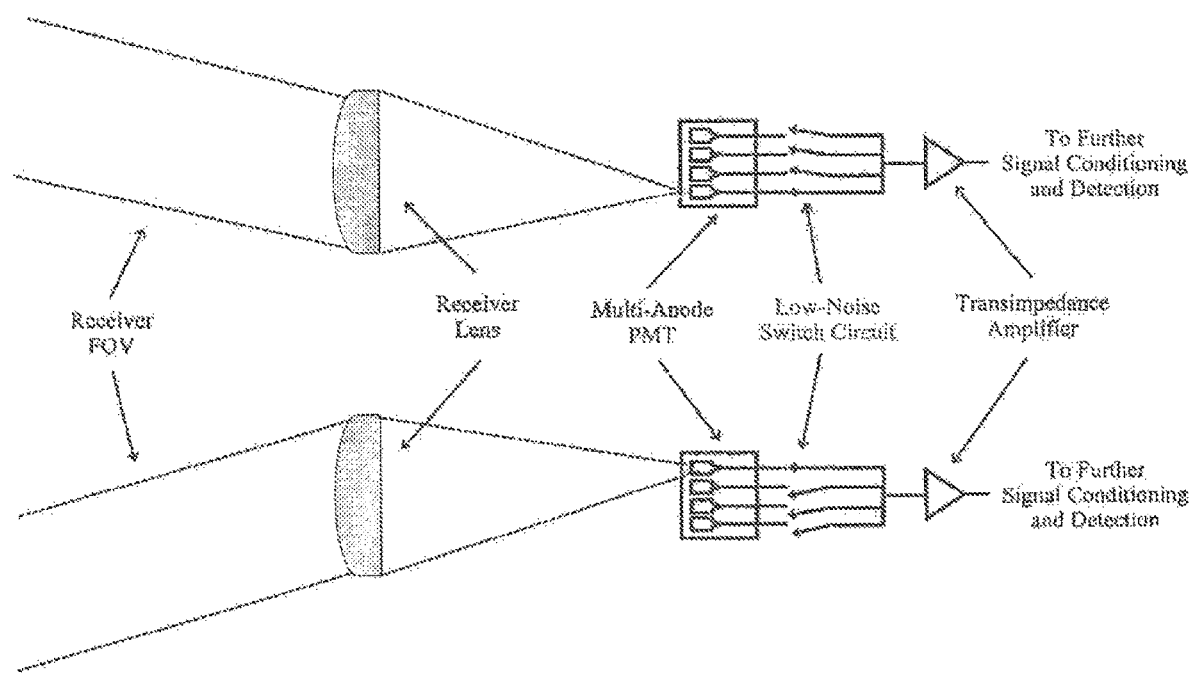
FIG. 3 is an illustration of receiver lenses and corresponding circuitry.

For example, FIG. 3 shows an electronic mechanism for scanning the receiver field of view using a multiple-anode photomultiplier tube, in which separate gain-producing dynode arrays and anodes are provided in a one- or two-dimensional arrangement such that light striking a spatial location on the photocathode produces an electrical signal at the anode corresponding to the photocathode spatial location. By placing the multiple-anode photomultiplier tube at the focus of a lens the angular position of the remote transmitter beam is converted into a spatial location on the photocathode. This receiver can serve a dual purpose; sensing the location of the remote transmitter for guidance; and by selecting only the anode corresponding to the photocathode location where the transmitter signal is detected a specific field of view can be obtained, as in FIG. 2, thereby rejecting interfering light sources.

Figure 4:
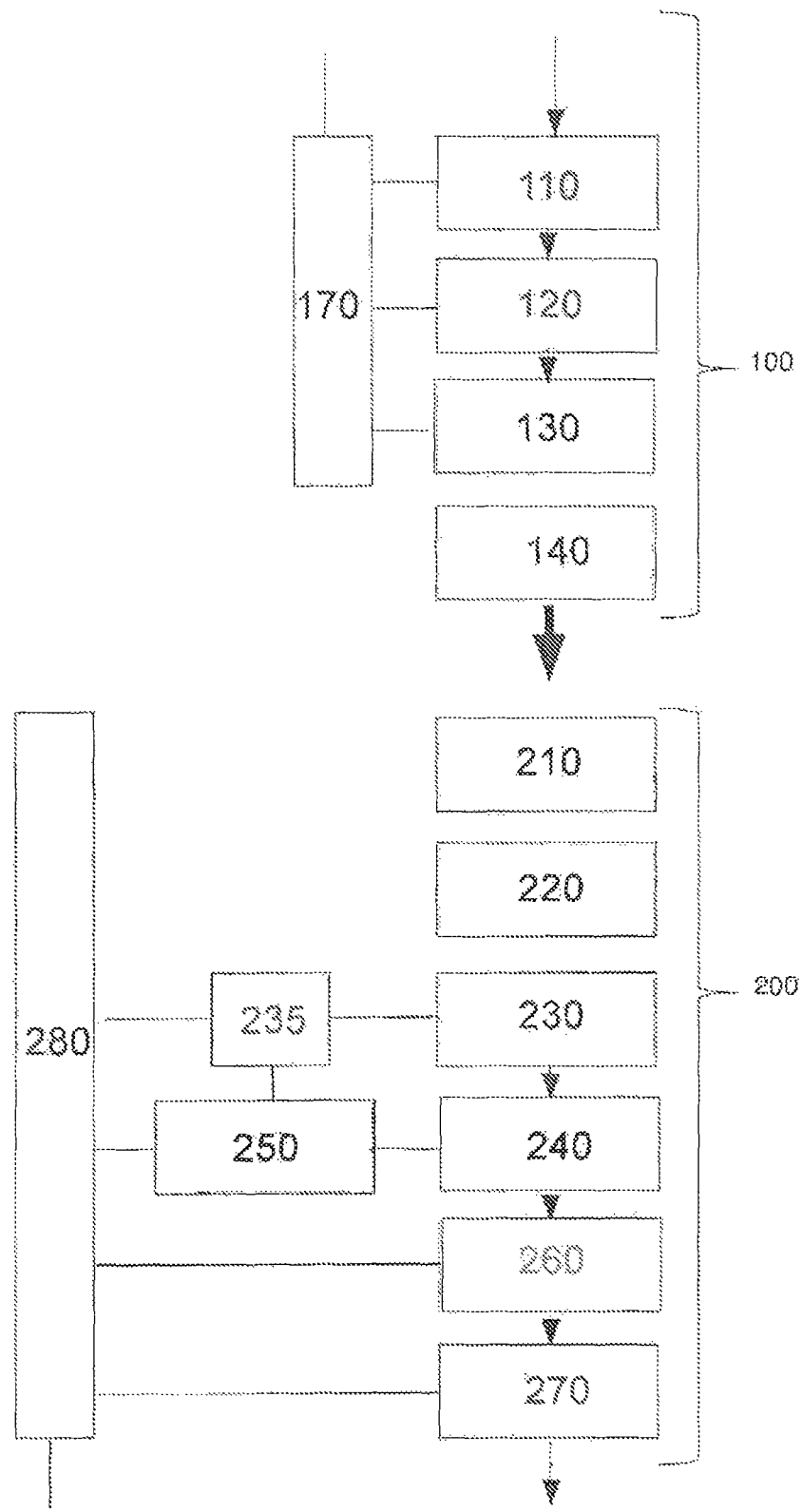
FIGS. 4-8 are block diagrams of exemplary embodiments of transceivers.

The components of an exemplary optical transceiver are now described with reference to FIG. 4. The transmitter 100 comprises a series of electronic components used to convert an incoming data signal into an outgoing optical signal that can be transmitted through the aqueous medium. A data signal is conducted to a data conversion module 110, which converts the incoming data, typically conveyed using either a conducting cable or a fiber-optic cable, into an on-off keyed format, such as $8b/10b$ encoding or pulse-position modulation, which is appropriate for use by the transmitter. This module may typically also provide the functions of ascertaining whether a data connection is present on the cable side, and in turn provide a signaling format that the transmitter can transmit to a remote receiver so as to alert the remote transceiver as to its presence. The output of the data conversion module 110 is conveyed to a transmitter drive module 120, which receives the output of the data conversion module 110 and by use of amplifiers and other electronic components converts the output of the data conversion module 110 into a drive signal for the light source 130, either singly or in a plurality (e.g., an array), such that the optical output of the light source 130 varies between a lower optical power state (e.g., with little or no optical output) and a higher optical power state.

The electronic circuits of the transmitter drive module 120 may be designed so as to maintain as much fidelity as possible between the temporal characteristics (pulse width, risetime and falltime) of the electronic output waveform of the data conversion module 110 and the optical output waveform of the light source 130. This may require a combination of electronic feedback within the amplifier circuits, temperature compensation to correct for temperature-induced changes in the optical output of the light source 130 for a given electrical current conveyed from the transmitter drive module 120, or optical feedback from the light source 130 into circuits associated with the transmitter drive module 120 such that the optical waveform exhibits maximum fidelity to the input electrical waveform.

As noted above, the light source may be, for example, an LED source or a laser source, such as an InGaN based LED or current driven solid state laser such as an InGaN laser. The choice of whether an LED or laser is used will depend largely on the data bandwidth required. In some embodiments, it may be difficult to achieve to achieve data bandwidths of much greater than 10 or 20 Mbps using LEDs due to carrier-lifetime effects in the PN junction leading to long temporal decays of the optical output.

In contrast, laser sources may operate with a significantly shorter temporal pulse width. In some embodiments this is because when the drive current to the laser drops below a threshold level, lasing ceases, and the output intensity of the laser rapidly decreases. Similarly, as the drive current increases across the lasing threshold, the output intensity of the laser may rapidly increase. Accordingly, the modulated laser output may reproduce even a rapidly modulated drive signal with very high fidelity. Accordingly, in some embodiments, a data rate transmission rate of greater than 10 Mbps, 50 Mbps, 75 Mbps, 100 Mbps, 200 Mbps, 300 Mbps, 400 Mbps, 500, Mbps, 600 Mbps, 1000 Mbps or more may be provided.

The optical output of the light source may be modified in angular extent by use of an optical element 140. The optical element 140 may be, for example, a transparent epoxy lens integral to an LED or diode laser in an industry-standard package, or, particularly in the case of a laser in lieu of an LED, this external element may be a lens or other refractive, reflective, or diffractive element as required to shape the transmitter beam into the desired angular field.

A power supply 170 is provided to condition input power from the platform hosting the transmitter 100 and provide the required voltages and currents to power the various electronic modules of the transmitter 100. This power supply 170 may typically be a high-efficiency, low-noise switching supply, with one or more outputs.

The receiver 200 of the optical transceiver will generally comprise an optical element 210 which collects incoming light and directs it to the photosensitive area of an optical detector 230. The optical element 210 may be a spherical or aspherical lens, or another reflective, refractive, or diffractive optical element (or grouping of elements) selected so as to match the desired angular field and collecting area with the photosensitive area of the detector. In one embodiment a field lens may be added following the optical element 210 in order to illuminate the surface of the optical detector 230 more uniformly.

An optical filter 220 (or any other suitable wavelength selective elements) will either precede the optical element 210 (be placed on the side towards the remote transmitter 100) or follow the optical element 210 but precede the optical detector 230. The purpose of the optical filter is to as completely as possible transmit only the optical wavelength or wavelengths corresponding to those emitted by the remote transmitter 100 and to reject as completely as possible the wavelength or wavelengths emitted by an adjacent transmitter, as well as ambient sunlight and other extraneous light. The optical filter 220 may typically be a colored (absorbing) glass filter, a colored (absorbing) plastic filter, or an interference (reflecting) filter or wavelength diffractive element, as appropriate to the required optical bandwidth, rejection and angular acceptance.

The optical detector 230 converts the light collected by optical element 210 and transmitted by optical filter 220 into an electrical signal for further processing. The optical detector is followed by an amplifier module 240. In one embodiment the optical detector 230 may be a semiconductor detector such as a silicon PIN photodiode. In this embodiment the amplifier module 240 comprises a preamplifier and an automatic gain control amplifier to amplify the electrical output of the photodiode to match the electrical output to electronic stages. A power supply 235 provides a low bias voltage to the PIN photodiode to reduce shunt capacitance and improve temporal response.

Figure 5:
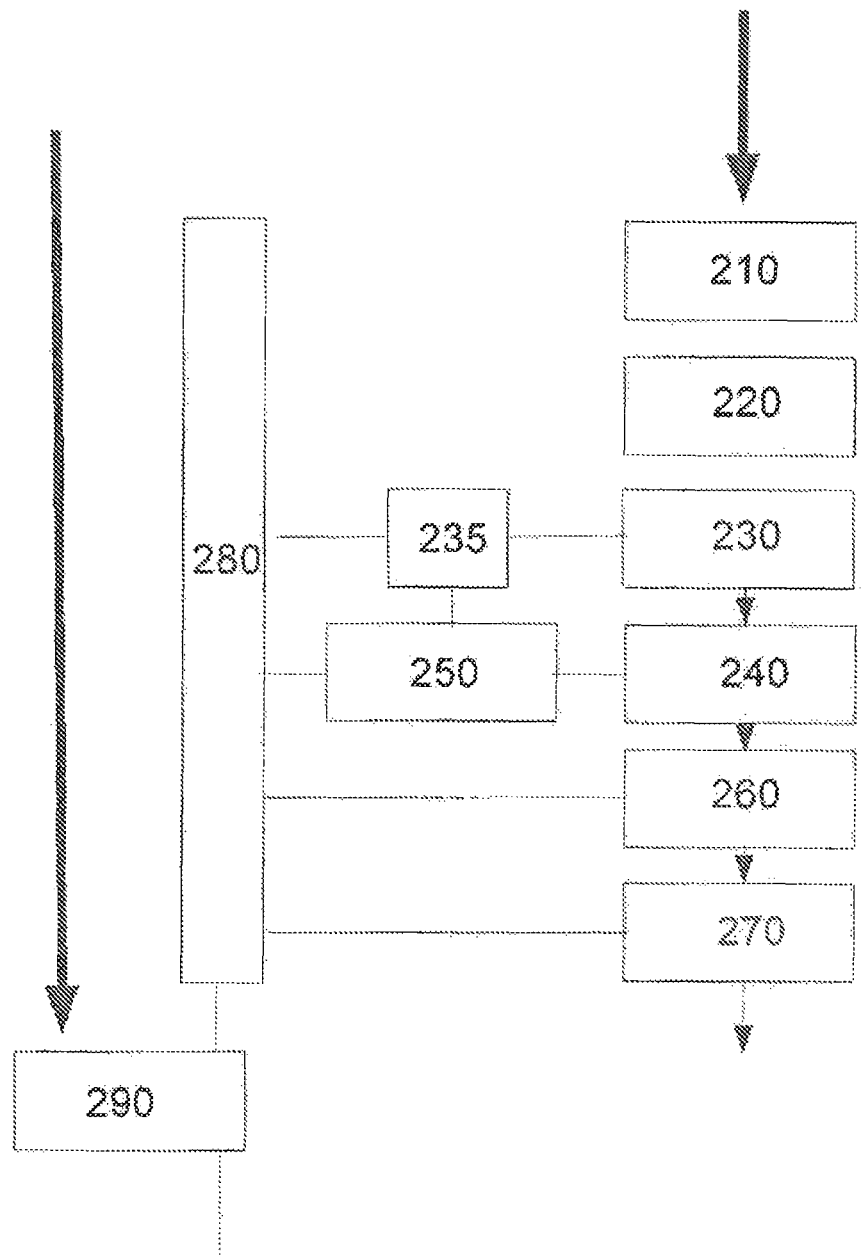

In some embodiments, e.g., as illustrated in FIG. 5, using an avalanche photodiode as the optical detector 230 the power supply 235 would be of a higher voltage to drive the photodiode into the avalanche regime and provide electronic gain. In this embodiment the power supply 235 would typically have a temperature sensor (such as a thermistor) to monitor the avalanche photodiode temperature and automatically adjust the voltage output to compensate for temperature dependence in the avalanche voltage of the avalanche photodiode. In this embodiment the amplifier module 240 may also provide a small fraction of the amplified electrical signal to an automatic gain control module 250 which integrates the electrical signal, conditions it and supplies it to a voltage-control input of the power supply 235, thereby controlling the voltage of the power supply 235 and thereby the gain of the avalanche photodiode to match varying light levels received at the optical detector 230 due to received transmitter light or other detected light.

The automatic gain control module may itself, e.g., in its own internal circuits, include variable gain to keep the output signal within the required range for subsequent processing (such as in the demodulation module 260).

In an embodiment using a photomultiplier tube the as the optical detector 230 a power supply 235 supplies high voltage (100-500V typical) to the photomultiplier tube in order to provide fast temporal response and electronic gain. Typically the power supply 235 in this embodiment will have a voltage control input, as in an embodiment using the avalanche photodiode, so that a similar automatic gain control module 250 can control the voltage supplied to the photomultiplier tube and thereby its electronic gain to match varying light levels received at the optical detector 230 due to received transmitter light or other detected light, as well as to protect the photomultiplier tube from damage due to high light levels.

In an embodiment that uses a photomultiplier tube at data rates above, e.g., 100 Mbps, such as 622 Mbps or 1000 Mbps, special consideration may be taken with the choice of photomultiplier tube. A very high bandwidth tube may be required, and particular care may be needed in its operation. For example, it may be necessary to utilize only the first few stages of a conventional high-speed photomultiplier tube, drawing the signal current from an intermediate dynode stage, rather than from the anode, in order to obtain fast enough rise and fall times to support the high bit rate. In an additional embodiment a photomultiplier tube which uses a micro-channel plate as the electronic gain medium in lieu of a conventional dynode structure may be used. In a further embodiment, a hybrid photodiode may be used, a device which combines a vacuum stage operating at high voltage followed by an internal semiconductor avalanche structure may be used to provide a significant photosensitive area and electronic gain while supporting the bandwidth required for, e.g., 1000 Mbps operation. In another embodiment, a vacuum photodiode, which provides a large collecting area and high speed without internal electronic gain may be used, provided that sufficient gain can be provided in subsequent electronic amplification stages.

The output of the amplifier module 240 is conveyed to a demodulation module 260 which detects the amplified waveform using a waveform detection module which may include, e.g., Schmidt triggers, clocks and other circuits to convert the detected waveform into a signal that can be conveyed to the data conversion module 270 which converts the data format created by the demodulation module 260 from the detected optical waveform into a data format useable for an external data recipient located on the host platform.

A power supply 280 is provided to condition input power from the platform hosting the transmitter 100 and provide the required voltages and currents to power the various electronic modules of the receiver 200. This power supply 280 may typically be a high-efficiency, low-noise switching supply, with one or more outputs.

In the case of infrequent data exchanges, a power control module 290, which uses an optical detector and a low-powered circuit with an amplifier, electronic filter, a threshold circuit and a relay or electronic switch may be provided to sense the proximity of a remote transmitter and activate the local transmitter and receiver by connecting the input power between the power supply 170 (shown in FIG. 4)/power supply 280 and the power source on the platform.

In the embodiment illustrated in FIG. 1 the transmitter 100 and the receiver 200 will be collocated in a pressure vessel 300 in order to isolate the transmitter 100 and receiver 200 from contact with the aqueous environment. In this embodiment windows 310 will be provided to convey light from the transmitter 100 into the aqueous medium and to a remotely mounted receiver, and from a remotely mounted transmitter through the aqueous medium to the receiver 200. These may typically be separate windows for the transmitter and receiver, but can also be a single window serving both transmitter and receiver.

Figure 6:
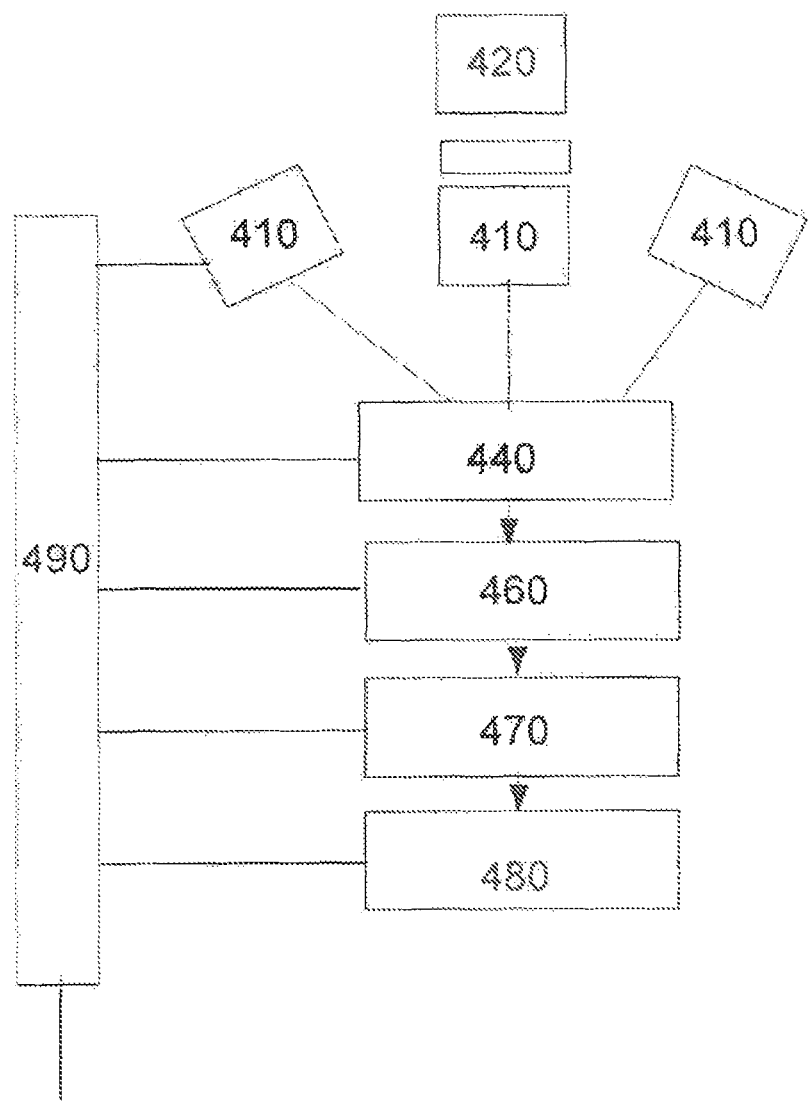

In an embodiment in which the directions of the transmitter beam and/or receiver field of view must be moved during operation (such as for communication between a moving and a stationary transceiver) an element is provided that senses the direction of a remote transmitter and generates control signals for a gimbal or other mechanical device that translates the pointing angle of the transmitter or receiver, or for an electronic pointing angles translator. FIG. 6 shows one embodiment, useful for the case where the angular directions must be controlled in one dimension only, in which an array of optical detectors 410 are pointed in different angles to sense the incoming transmitter beam. The optical detectors are provided with optical filters 415 (or other wavelength selective elements) to transmit light from the remote transmitter and reject backscattered light from the local transmitter. The optical detectors may also be provided with lenses 420 or another optical element capable of defining the optical detector field of view. The electrical signal from the optical detectors 410 is conveyed to an amplifier module 440. The amplifier module 440 will typically include automatic gain control in order to maintain the output signal within the range of voltage levels useable by following stages. The electrical output from the optical detectors is conveyed to a guidance processor module 460 which measures the signal strength from each optical detector and calculates the direction of the remote transmitter. The calculation can be accomplished for coarse direction by taking the ratios of the strengths of the optical signals using either a system of operational amplifiers or by using an actual analog to digital conversion and performing the calculation in a microprocessor system. A more precise calculation of the direction of the remote transmitter can be accomplished in a microprocessor by taking into account the geometry of the detectors and the amount of remote transmitter light that will be intercepted by them as a function of angle.

Figure 7:
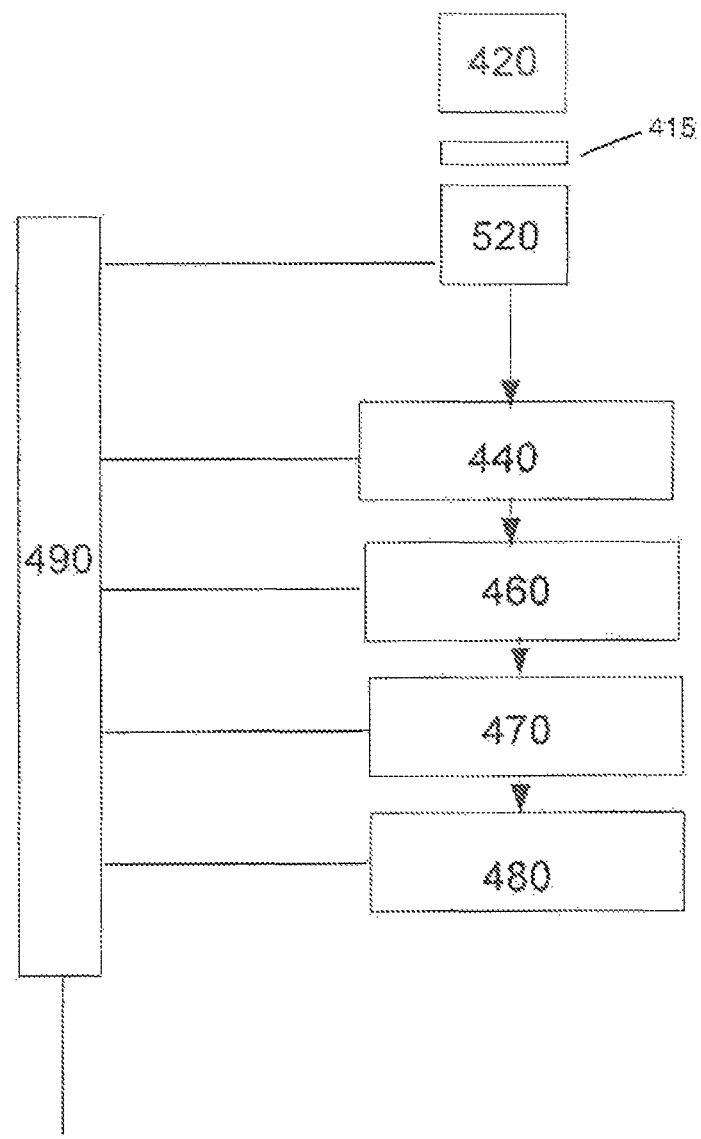

Another embodiment illustrated in FIG. 7 uses a position-sensitive optical detector 520 such as a position-sensing semiconductor photodiode (e.g., a split photodiode), position-sensing (e.g., resistive anode) photomultiplier tube, or a multiple-anode photomultiplier tube with a voltage divider circuit to provide the angular location of the remote transmitter. An imaging optical element 410 such as a lens is used to convert the angle of the incoming transmitter light into a position on the active area of the positions-sensitive optical detector 520. An optical filter 415 can be used to transmit light from the remote transmitter and reject ambient background light and backscattered local transmitter light. The electrical output of the position-sensitive detector 520 is conveyed to an amplifier module 440 and the output of the amplifier module 440 conveyed to a guidance processor module 460 for the generation of guidance signals. The guidance signals generated from this embodiment are accurate enough for precision platform guidance, if needed.

In addition to wavelength-selective optical filter 415, in order to reject background light (such as sunlight when the transceivers are shallow) an electronic filter may be included either in the amplifier module 440 or in the guidance processor module 460 in order to reject steady or slowly varying (un-modulated) optical signals and accept the modulated signal from the remote transmitter.

The output of the guidance processor module 460 is conveyed to a drive module 470 which provides electrical signals to a motor driven gimbal 480 (or other positioning device) on which are mounted the transmitter and receiver such that an electrical signal from the drive module 470 translates the angle of the transmitter and receiver relative to the housing. A power supply 490 is provided to condition power from the platform and provide the required voltages and currents to the respective modules.

Figure 8:
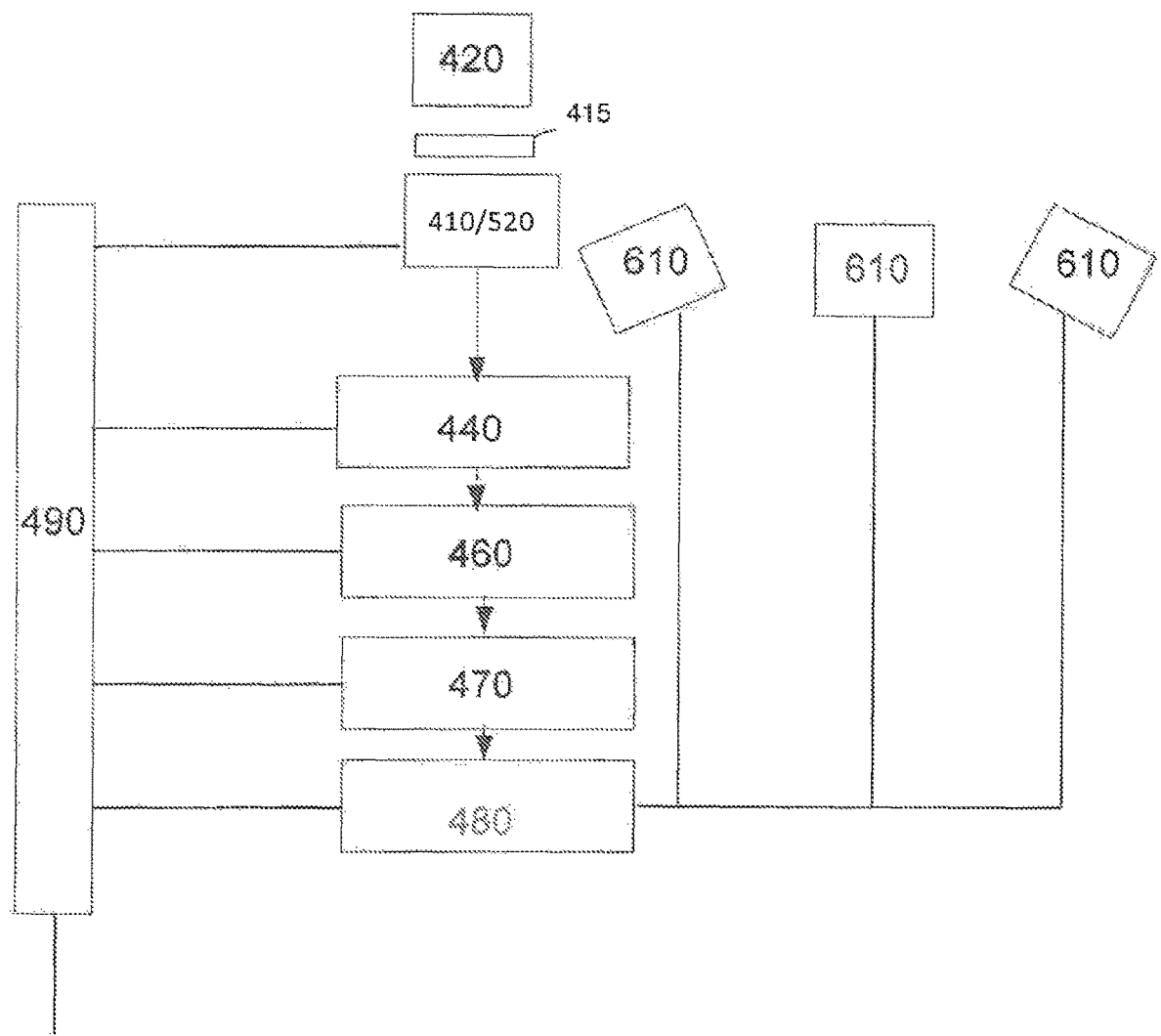

Another embodiment illustrated in FIG. 8 uses the output of the guidance processor module 460 to select angularly separated transmitter light sources or light source arrays 610 so as to project a transmitter beam into the desired direction. Another embodiment uses the output of the guidance processor to switch the output of a multiple-anode photomultiplier tube used as the optical detector so as to select the direction for which an incoming light beam will be sensed.

In some embodiments, the transceivers described herein may use channel coding techniques to increase link robustness and transmission rates. For example, low-density parity-check, LDPC, codes and rate adaptive channel codes may be used.

In some embodiments, the transceivers described herein may implement dynamic optimization of the transmission parameters. In underwater environments such as seismic sensing, the local water conditions can vary significantly. In order to accommodate the variation the optical links are dynamically configured to measure link loss mechanisms, alone or in combinations with other effects such as dispersion, and assign an optimal data rate. In addition, if the underwater environmental conditions permit, multi-carrier modes can be initiated. Local Digital Signal Processing, DSP, can be performed to adjust or compensate for the applicable transmission-reception parameters, or software can implement the communication control adjustments. The optical transmission receiver linkage can be monitored continuously in order to maintain link performance.

In some embodiments, receivers of the type herein may be used to transmit seismic data, e.g., from an autonomous underwater seismic node to a retrieval device. The retrieval device may be mounted on, for example, an submarine vessel, a remotely operated vehicle, or an autonomously operated vehicle. In some embodiments, the seismic data transfer may be performed at a rate of at least 10 Mbps, 100 Mbps, 500 Mbps, 1000 Mbps or more. In some embodiments, the transmission link is maintained for at least 1 second, 10 seconds, 1 minutes, 5 minutes, 10 minutes, 20 minutes, 30 minutes, 40 minutes, 50 minutes, 1 hour, or more. In some embodiments, the transmission occurs over a distance of at least 10 cm, 100 cm, 1 m, 2 m, 3 m, 5 m, 10 m, 20 m, 100 m or more.

Although in many embodiments (e.g., as described herein) it is advantageous to used wavelengths in the range of 400-600 nm (or any subrange thereof), in other cases depending on the application at hand any other suitable wavelengths may be used (e.g., wavelengths in the range of 300 nm to 1400 nm).

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03

What is claimed is:

1. A system to optically transfer seismic data through an aqueous medium, comprising:
   a retrieval device comprising:
      a first optical transmitter to transmit light;
      a first optical receiver;
      one or more optical detectors to sense a relative angle of a second optical transmitter of an ocean bottom seismic ("OBS") node; and
      at least one controller configured to:
         select, based on a signal from the one or more optical detectors of the retrieval device, an anode in a multiple-anode photomultiplier tube; and
         align an angular field of view of the first optical receiver with the second optical transmitter of the OBS node.

2. The system of claim 1, wherein the OBS node comprises:
   a second optical receiver comprising one or more optical detectors to detect a presence of the retrieval device and sense a relative angle of the first optical transmitter of the retrieval device.

3. The system of claim 1, wherein the OBS node comprises:
   a second optical receiver comprising one or more optical detectors to detect a presence of the retrieval device and sense a relative angle of the first optical transmitter of the retrieval device; and one or more controllers to adjust a transmission parameter used by the second optical transmitter to transmit light with the seismic data, and control the second optical transmitter to direct the light with the seismic data through the aqueous medium to the first optical receiver of the retrieval device.

4. The system of claim 1, wherein the OBS node comprises:
a second optical receiver comprising one or more optical detectors to detect a presence of the retrieval device and sense a relative angle of the first optical transmitter of the retrieval device;
one or more controllers to adjust a transmission parameter used by the second optical transmitter to transmit light with the seismic data, and control the second optical transmitter to direct the light with the seismic data through the aqueous medium to the first optical receiver of the retrieval device; and
the second optical transmitter to enter a power up state responsive to detection, by the second optical receiver, of the presence of the retrieval device, and transmit the light with the seismic data through the aqueous medium using the transmission parameter adjusted by the one or more controllers, the light with the seismic data directed towards the first optical receiver through the aqueous medium by the one or more controllers.

5. The system of claim 1, comprising:
the first optical receiver of the retrieval device to receive the light with the seismic data transmitted through the aqueous medium by the second optical transmitter of the OBS node.

6. The system of claim 1, comprising:
a photodiode of the first optical receiver that generates electrical output based on the light with the seismic data transmitted by the second optical transmitter and received by the first optical receiver.

7. The system of claim 1, comprising:
a second optical retriever comprising one or more optical detectors to detect a presence of the retrieval device based on the light transmitted by the first optical transmitter of the retrieval device.

8. The system of claim 1, wherein the OBS node comprises:
a second optical receiver comprising one or more optical detectors to detect a presence of the retrieval device and sense a relative angle of the first optical transmitter of the retrieval device; and
one or more controllers to:
adjust a transmission parameter used by the second optical transmitter to transmit light with the seismic data, and control the second optical transmitter to direct the light with the seismic data through the aqueous medium to the first optical receiver of the retrieval device; and
select, based on a signal from the one or more optical detectors of the OBS node, an anode in a multiple-anode photomultiplier tube.

9. The system of claim 1, comprising:
the retrieval device to receive the seismic data from the OBS node placed on an ocean bottom, and store the seismic data in memory of the retrieval device.

10. The system of claim 1, wherein the OBS node comprises:
one or more controllers to adjust a transmission parameter used by the second optical transmitter to transmit light with the seismic data, and control the second optical transmitter to direct the light with the seismic data through the aqueous medium to the first optical receiver of the retrieval device based on the relative angle of the first optical transmitter of the retrieval device sensed by the one or more optical detectors.

11. The system of claim 1, wherein the second optical transmitter comprises a solid state light sources comprising at least one of an InGaN based light source, an LED, and a laser.

12. The system of claim 1, wherein the OBS node comprises:
one or more controllers to adjust, responsive to identification of an underwater environmental condition, a transmission parameter used by the second optical transmitter to transmit light with the seismic data.

13. The system of claim 1, wherein the OBS node comprises one or more diffractive optical elements to steer an optical transmission beam towards the retrieval device.

14. A method of optically transferring seismic data through an aqueous medium, comprising:
transmitting, by a retrieval device comprising a first optical transmitter and a first optical receiver, light;
sensing, by one or more optical detectors of the retrieval device, a relative angle of a second optical transmitter of an ocean bottom seismic ("OBS") node;
selecting, by at least one controller of the retrieval device, based on a signal from the one or more optical detectors of the retrieval device, an anode in a multiple-anode photomultiplier tube; and
aligning, by the at least one controller of the retrieval device, an angular field of view of the first optical receiver with the second optical transmitter of the OBS node.

15. The method of claim 14, comprising:
detecting, by the OBS node comprising a second optical receiver having one or more optical detectors, a presence of the retrieval device.

16. The method of claim 14, comprising:
adjusting, by one or more controllers of the OBS node, a transmission parameter used by the second optical transmitter to transmit light with the seismic data.

17. The method of claim 14, comprising:
controlling, by one or more controllers of the OBS node, the second optical transmitter to direct the light with the seismic data through the aqueous medium to the first optical receiver of the retrieval device.

18. The method of claim 14, comprising:
detecting, by the OBS node comprising a second optical receiver having one or more optical detectors, a presence of the retrieval device;
entering, by the second optical transmitter of the OBS node, a power up state responsive to detection, by the second optical receiver, of the presence of the retrieval device.

19. The method of claim 14, comprising:
transmitting, by the second optical transmitter of the OBS node, the light with the seismic data through the aqueous medium using a transmission parameter adjusted by the at least one controller, the light with the seismic data directed towards the first optical receiver through the aqueous medium by one or more controllers.

20. The method of claim 14, comprising:
receiving, by the first optical receiver of the retrieval device, the light with the seismic data transmitted through the aqueous medium by the second optical transmitter of the OBS node.

\* \* \* \* \*